(12) United States Patent
Tamura et al.

(10) Patent No.: US 10,830,312 B2
(45) Date of Patent: Nov. 10, 2020

(54) ECCENTRIC OSCILLATION TYPE SPEED REDUCER

(71) Applicant: SUMITOMO HEAVY INDUSTRIES, LTD., Tokyo (JP)

(72) Inventors: Mitsuhiro Tamura, Kanagawa (JP); Akira Yamamoto, Kanagawa (JP)

(73) Assignee: SUMITOMO HEAVY INDUSTRIES CO., LTD., Tokyo (JP)

( * ) Notice: Subject to any disclaimer, the term of this patent is extended or adjusted under 35 U.S.C. 154(b) by 11 days.

(21) Appl. No.: 16/279,499

(22) Filed: Feb. 19, 2019

(65) Prior Publication Data

US 2019/0264780 A1  Aug. 29, 2019

(30) Foreign Application Priority Data

Feb. 28, 2018  (JP) .................................. 2018-034330

(51) Int. Cl.
  *F16H 1/32*  (2006.01)

(52) U.S. Cl.
  CPC ......... *F16H 1/32* (2013.01); *F16H 2001/325* (2013.01)

(58) Field of Classification Search
  CPC . F16H 1/32; F16H 2001/325; F16H 2001/327
  USPC ................................................ 475/901, 902
  See application file for complete search history.

(56) References Cited

U.S. PATENT DOCUMENTS

| | | | | |
|---|---|---|---|---|
| 3,037,400 A | * | 6/1962 | Sundt | F16H 1/32 475/180 |
| 4,713,985 A | * | 12/1987 | Ando | F16H 1/32 475/168 |
| 5,536,218 A | * | 7/1996 | Fukaya | F16H 37/041 475/178 |
| 6,450,913 B1 | * | 9/2002 | Strowik | B60N 2/0224 475/178 |
| 8,647,226 B2 | * | 2/2014 | Kume | F16H 1/32 475/162 |
| 9,309,806 B2 | * | 4/2016 | Kuroda | F02B 37/186 |
| 2006/0040779 A1 | | 2/2006 | Tsurumi et al. | |
| 2019/0390735 A1 | * | 12/2019 | Tamura | F16H 55/06 |

FOREIGN PATENT DOCUMENTS

JP   2006-057772 A   3/2006
JP   2019132363 A  *  8/2019  ............... F16H 1/32

\* cited by examiner

*Primary Examiner* — Sherry L Estremsky
(74) *Attorney, Agent, or Firm* — Michael Best & Friedrich LLP

(57) ABSTRACT

An eccentric oscillation type speed reducer includes: an internal gear; an external gear which meshes with the internal gear; an eccentric body shaft which oscillates the external gear; and a carrier disposed at a side portion of the external gear in an axial direction, in which the carrier includes a first carrier which is disposed on one side in the axial direction of the external gear, and a second carrier which is disposed on the other side in the axial direction of the external gear, a driven member is connected to the first carrier, the first carrier is made of metal, and the second carrier is made of resin.

6 Claims, 3 Drawing Sheets

ECCENTRIC OSCILLATION TYPE SPEED REDUCER

RELATED APPLICATIONS

Priority is claimed to Japanese Patent Application No. 2018-034330, filed Feb. 28, 2018, the entire content of which is incorporated herein by reference.

BACKGROUND

Technical Field

Certain embodiments of the present invention relate to an eccentric oscillation type speed reducer.

Description of Related Art

In the related art, the applicant of this application disclosed a planetary speed reducing mechanism provided with an external gear which is oscillated by an eccentric body, and an internal gear with which the external gear internally meshes.

SUMMARY

According to an embodiment of the present invention, there is provided an eccentric oscillation type speed reducer including: an internal gear; an external gear which meshes with the internal gear; an eccentric body shaft which oscillates the external gear; and a carrier disposed at a side portion of the external gear in an axial direction, in which the carrier includes a first carrier which is disposed on one side in the axial direction of the external gear, and a second carrier which is disposed on the other side in the axial direction of the external gear, a driven member is connected to the first carrier, the first carrier is made of metal, and the second carrier is made of resin.

According to another embodiment of the present invention, there is provided an eccentric oscillation type speed reducer including: an internal gear provided in a casing; an external gear which meshes with the internal gear; an eccentric body shaft which oscillates the external gear; and a carrier disposed at a side portion of the external gear in an axial direction, in which the casing and the external gear are made of resin, and the carrier is made of metal.

DETAILED DESCRIPTION

Figure 1:
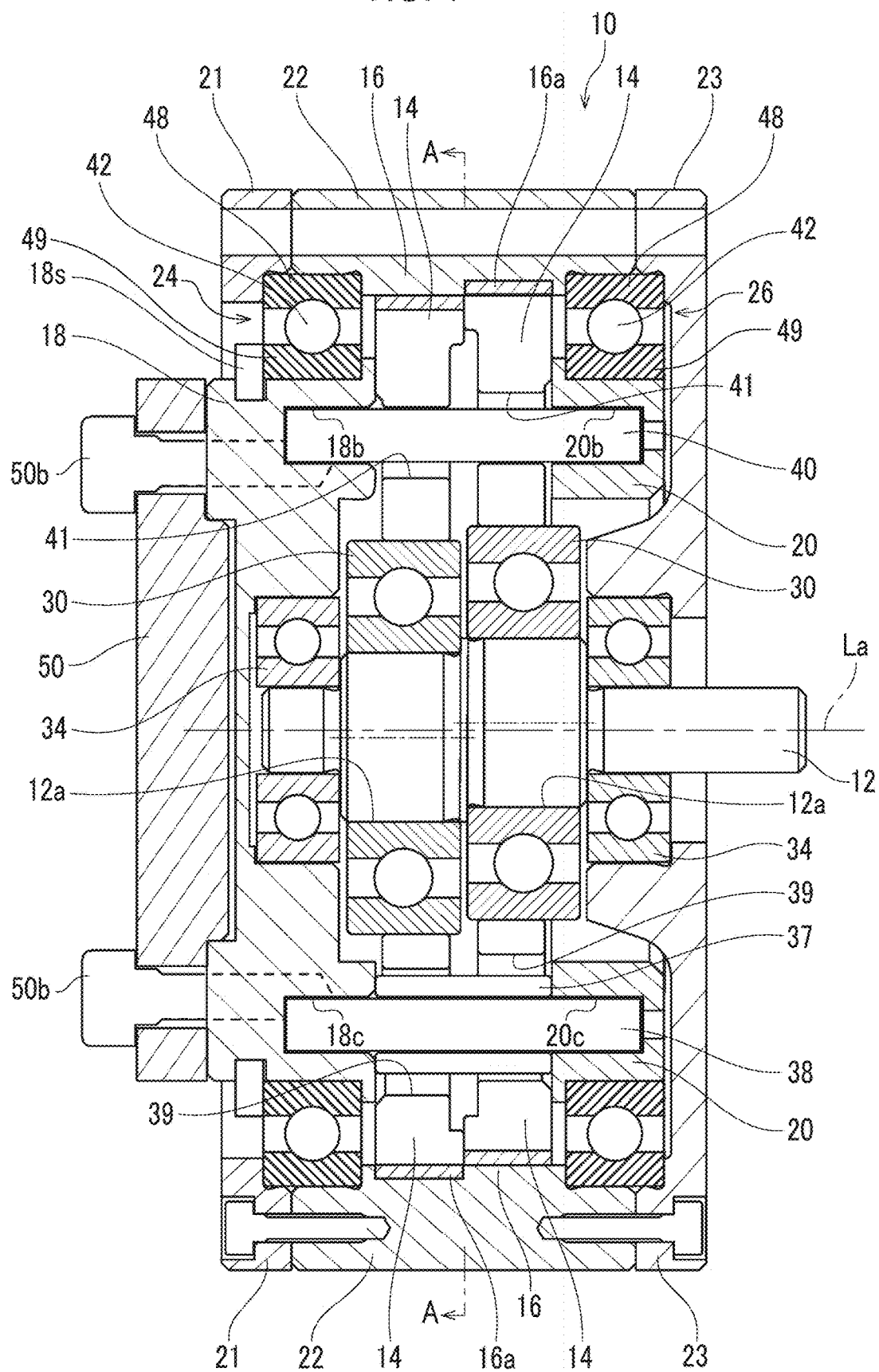
FIG. 1 is a side sectional view showing an eccentric oscillation type speed reducer according to one embodiment.

The planetary speed reducing mechanism of the related art is provided with two flanges, casings, or the like, as main constituent elements, in addition to the external gear and the internal gear. In the speed reducing mechanism of the related art, since these main constituent elements are made of a steel material, the weight of the speed reducing mechanism tends to increase. Regarding such a speed reducing mechanism, it is required to reduce weight in order to expand the use.

It is desirable to provide an eccentric oscillation type speed reducer which can be reduced in weight, which has been made in view of such problems.

According to an embodiment, since the first carrier to which the driven member is connected is made of metal, it is possible to obtain required strength or rigidity, and since the second carrier is made of resin, a reduction in weight can be made.

Any combination of the above constituent elements or mutual substitution of constituent elements or expressions of the present invention between methods, systems, or the like is also effective as an aspect of the present invention.

Hereinafter, the present invention will be described with reference to the respective drawings, based on preferred embodiments. In an embodiment, a comparative example, and a modification example, identical or corresponding constituent elements and members are denoted by the same reference numerals, and overlapping description is appropriately omitted. Further, the dimensions of members in each drawing are shown in an appropriately enlarged or reduced manner for easy understanding. Further, in each drawing, some of members which are not important for describing an embodiment are omitted in illustration.

Further, terms including ordinal numbers such as first, second, or the like are used to describe various constituent elements. However, these terms are used only for the purpose of distinguishing one constituent element from the other constituent element, and the constituent elements are not limited by these terms.

One Embodiment

Figure 2:
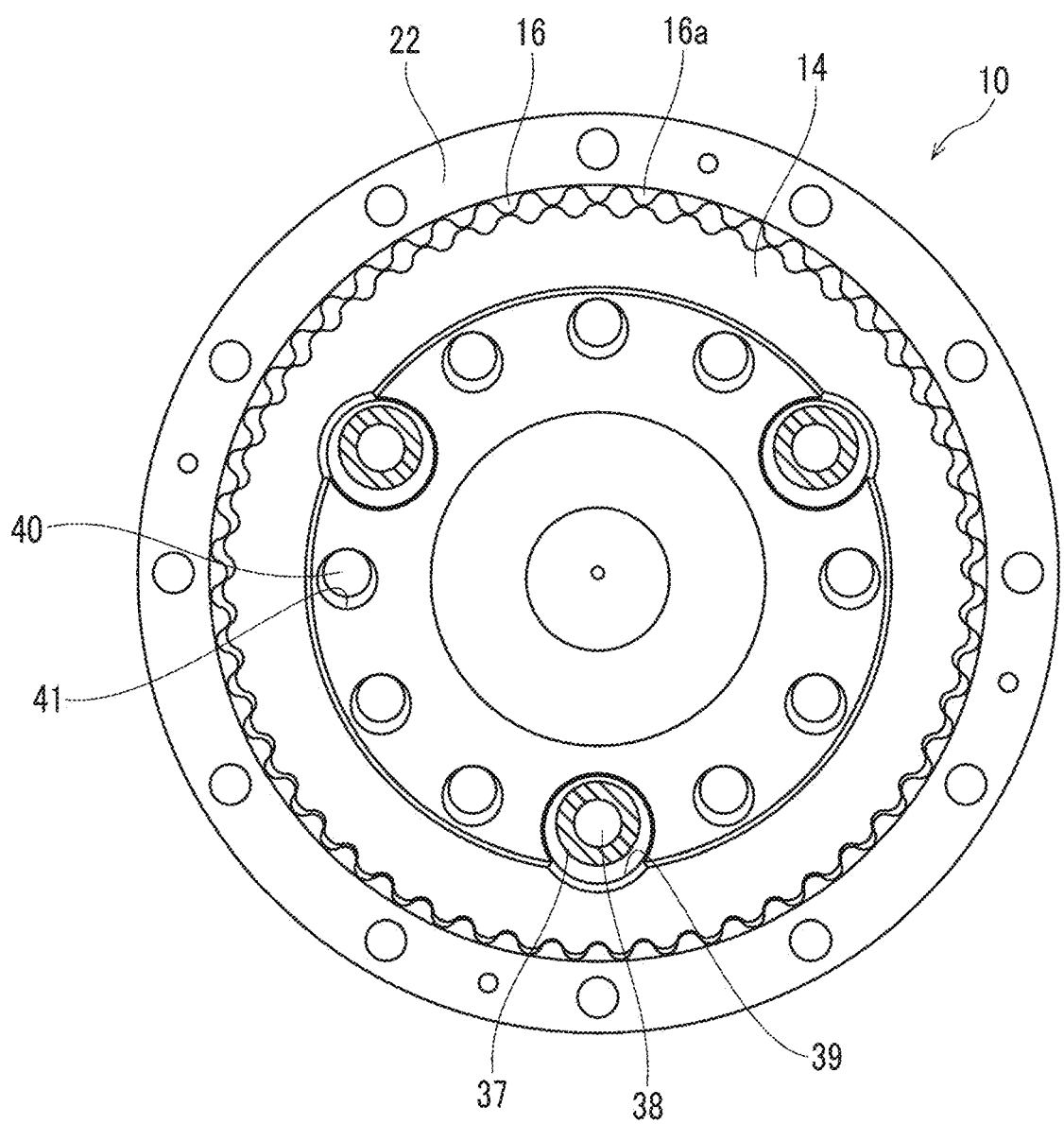
FIG. 2 is a sectional view taken along line A-A of the eccentric oscillation type speed reducer of FIG. 1.

Hereinafter, the configuration of an eccentric oscillation type speed reducer 10 according to one embodiment will be described with reference to FIGS. 1 and 2. FIG. 1 is a side sectional view showing the eccentric oscillation type speed reducer 10 of one embodiment. FIG. 2 is a sectional view of the eccentric oscillation type speed reducer 10 taken along line A-A of FIG. 1. In these drawings, for easy understanding, one of two external gears 14 is shown and the other is not shown. The other external gear 14 is different from one external gear 14 in that it has a phase difference of 180 degrees, and the other configurations are the same. The eccentric oscillation type speed reducer 10 of this embodiment is an eccentric oscillation type speed reducer which oscillates an external gear which meshes with an internal gear, thereby causing one of the external gear and the internal gear to rotate, and outputs the generated motion component from an output member to a driven device.

The eccentric oscillation type speed reducer 10 mainly includes an input shaft 12, the external gear 14, an internal gear 18, carriers 18 and 20, a casing 22, main bearings 24 and 25, an inner pin 40, and a carrier pin 38. Hereinafter, a direction along a central axis La of the internal gear 16 is referred to as an "axial direction", and a circumferential direction and a radial direction of a circle centered on the central axis La are respectively referred to as a "circumferential direction" and a "radial direction". Further, in the following, for convenience, one side in the axial direction (the right side in the drawing) is referred to as an input side and the other side (the left side in the drawing) is referred to as an anti-input side.

Input Shaft

The input shaft 12 is rotated around a rotation center line by the rotational power which is input from a driving device (not shown). The eccentric oscillation type speed reducer 10 of this embodiment is a center crank type in which the rotation center line of the input shaft 12 is provided on the same axis as the central axis La of the internal gear 16. The driving device is, for example, a motor, a gear motor, an engine, or the like.

The input shaft 12 in this embodiment is an eccentric body shaft having a plurality of eccentric portions 12a for oscillating the external gear 14. There is a case where the input shaft 12 having such a configuration is referred to as a crankshaft. The axis of the eccentric portion 12a is eccentric with respect to the rotation center line of the input shaft 12. In this embodiment, two eccentric portions 12a are provided, and the eccentric phases of the eccentric portions 12a adjacent to each other are shifted by 180°.

The input side of the input shaft 12 is supported on a second cover 23 through an input shaft bearing 34, and the anti-input side thereof is supported on the first carrier 18 through the input shaft bearing 34. That is, the input shaft 12 is supported so as to be rotatable with respect to the first carrier 18 and the second cover 23. The configuration of the input shaft bearing 34 is not particular limited. However, in this example, the input shaft bearing 34 is a ball bearing having a spherical rolling element. Pressurization may be applied to the input shaft bearing 34. However, in this example, pressurization is not applied thereto.

External Gear

The external gear 14 is individually provided corresponding to each of the plurality of eccentric portions 12a. The external gear 14 is rotatably supported on the corresponding eccentric portion 12a through the eccentric bearing 30. As shown in FIG. 2, twelve through-holes are formed at equal intervals in the external gear 14 at positions offset from the axis of the external gear 14. The carrier pins 38 are inserted into three holes disposed at equal intervals of 120 degrees, among the through-holes, and the inner pins 40 are inserted into the remaining nine holes. For this reason, the former is referred to as a carrier pin hole 39 and the latter is referred to as an inner pin hole 41. These holes may have the same diameter. However, in this example, the diameter of the carrier pin hole 39 is larger than the diameter of the inner pin hole 41.

The carrier pin hole 39 and the inner pin hole 41 are circular holes provided at the same radial position. Wavy teeth are formed on the outer periphery of the external gear 14, and this tooth moves while coming into contact with an internal tooth 16a of the internal gear 16, so that the external gear 14 can oscillate in a plane with a center axis as a normal line. The inner pin hole 41 through which the inner pin 40 passes is formed in the external gear 14. A clearance which serves as a play for absorbing an oscillation component of the external gear 14 is provided between the inner pin 40 and the inner pin hole 41. The inner pin 40 and the inner wall surface of the inner pin hole 41 partially come into contact with each other.

Internal Gear

The internal gear 16 meshes with the external gear 14. The internal gear 16 in this embodiment has the internal teeth 16a formed integrally with the inner peripheral portion of the casing 22. That is, in this example, the internal teeth 16a are portions seamlessly provided with respect to the casing 22. In this embodiment, the number of internal teeth 16a of the internal gear 16 is one more than the number of external teeth of the external gear 14.

Carrier

The carriers 18 and 20 are disposed at side portions of the external gear 14 in the axial direction. The carriers 18 and 20 include a first carrier 18 which is disposed at the side portion on the anti-input side of the external gear 14, and a second carrier 20 which is disposed at the side portion on the input side of the external gear 14. The first carrier 18 and the second carrier 20 are rotatably supported on the casing 22 through the first main bearing 24 and the second main bearing 26. Each of carriers 18 and 20 has a disk shape as a whole. The first carrier 18 rotatably supports the input shaft 12 through the input shaft bearing 34. The second carrier 20 may be configured to support the input shaft through the input shaft bearing. However, in this example, the second carrier 20 does not support the input shaft bearing 34 and the input shaft 12.

The first carrier 18 and the second carrier 20 are connected to each other through the carrier pin 38 and the inner pin 40. The carrier pin 38 and the inner pin 40 axially penetrate the plurality of external gears 14 at positions offset in the radial direction from the axis of the external gear 14. In this example, the carrier pin 38 and the inner pin 40 are provided separately from the carriers 18 and 20. However, some of these pins may be integrally formed as part of the carriers 18 and 20. The carrier pin 38 and the inner pin 40 will be described later.

One of the first carrier 18 and the casing 22 functions as an output member which outputs rotational power to the driven device, and the other functions as a fixed member which is fixed to an external member for supporting the eccentric oscillation type speed reducer 10. The output member is rotatably supported on the fixed member through the main bearings 24 and 26. In this embodiment, the output member is the first carrier 18 and the fixed member is the casing 22. A driven member 50 which is rotationally driven by the eccentric oscillation type speed reducer 10 is connected to the end face on the anti-input side of the first carrier 18 by bolts 50b.

Casing

The casing 22 has a hollow tubular shape as a whole, and the internal gear 16 is provided at the inner peripheral portion thereof. A flange or the like may be provided at the outer peripheral portion of the casing 22. However, in this example, the flange is not provided. The casing 22 is provided with a first cover 21 which covers the anti-input side of the casing 22, and the second cover 23 which covers the input side of the casing 22. The first cover 21 and the second cover 23 are fixed to the casing 22 by a plurality of bolts arranged in the circumferential direction.

The casing 22 is provided with a recessed portion which accommodates the input side of an outer ring of the first main bearing 24. The first cover 21 is provided with a recessed portion which accommodate a part on the anti-input side of the outer ring of the first main bearing 24. The outer ring of the first main bearing 24 is axially sandwiched and supported between the casing 22 and the first cover 21. The casing 22 is provided with a recessed portion which accommodates the input side of an outer ring of the second main bearing 26. The second cover 23 is provided with a recessed portion which accommodate a part on the anti-input side of the outer ring of the second main bearing 26. The outer ring of the second main bearing 26 is axially sandwiched and supported between the casing 22 and the second cover 23. The second cover 23 is provided with a recessed portion which accommodates an outer ring of the input shaft bearing 34 on the input side. That is, the second cover 23 rotatably supports the input side of the input shaft 12 through the input shaft bearing 34.

Main Bearing

The main bearings 24 and 26 include the first main bearing 24 which is disposed between the first carrier 18 and the casing 22, and the second main bearing 26 which is disposed between the second carrier 20 and the casings 22. Each of the main bearings 24 and 26 in this embodiment is provided with a plurality of rolling elements 42 and a retainer (not shown). The plurality of rolling elements 42 are provided at intervals in the circumferential direction. The rolling element 42 in this embodiment is a spherical body. The retainer holds the relative positions of the plurality of rolling elements 42 and rotatably supports the plurality of rolling elements 42.

Each of the main bearings 24 and 26 in this embodiment is provided with an outer ring 48 and an inner ring 49 having rolling surfaces for the rolling element 42. The inner ring rolling surface may be provided on the outer peripheral surface of each of the carriers 18 and 20, instead of the inner ring. The outer ring 48 is fixed to the casing 22 by fitting such as a clearance fit, an interference fit, or a transition fit. The fitting gap may be set corresponding to the difference in thermal expansion coefficient. Precompression may be applied to the main bearings 24 and 26. However, in this example, precompression is not applied thereto.

Inner Pin

As shown in FIG. 1, the inner pin 40 is inserted into the inner pin hole 41 penetrated and formed in the external gear 14 with a gap therebetween. One end of the inner pin 40 is fitted into a recessed portion 18b of the first carrier 18, and the other end is fitted into a recessed portion 20b of the second carrier 20. The inner pin 40 is press-fitted into the recessed portions 18b and 20b and is not fixed by bolts or the like. The inner pin 40 is in contact with a part of the inner pin hole 41 formed in the external gear 14 and restrains the rotation of the external gear 14 to allow only the oscillation thereof. The inner pin 40 functions as a connecting member which contributes to transmission of power between the first carrier 18 and the second carrier 20, and the external gear 14.

Carrier Pin

The carrier pin 38 is inserted into the carrier pin hole 39 penetrated and formed in the external gear 14 with a gap therebetween. One end of the carrier pin 38 is fitted into a recessed portion 18c of the first carrier 18, and the other end is fitted into a recessed portion 20c of the second carrier 20. The carrier pin 38 is press-fitted to the recessed portions 18c and 20c and is not fixed by bolts or the like. The carrier pin 38 is surrounded by a tubular spacer 37. One end of the spacer 37 is in contact with the first carrier 18 and the other end is in contact with the second carrier 20. The spacer 37 functions as a spacer for maintaining the axial distance between the first carrier 18 and the second carrier 20 at an appropriate distance. The carrier pin 38 and the spacer 37 are not in contact with the carrier pin hole 39 of the external gear 14 and do not contribute to restraining the rotation of the external gear 14. The carrier pin 38 functions as a connecting member which contributes only to the connection between the first carrier 18 and the second carrier 20.

Next, a material configuring each constituent member of this embodiment will be described. In recent years, the use of speed reducers has expanded to collaborative robots or the like, which operate near a person. In order to expand the use, a reduction in the weight and a reduction in noise of the speed reducer are desired. Speed reducers of the related art are configured with constituent members made of iron-based metal, and thus, for a reduction in weight, it is conceivable to form the constituent members from materials with low specific gravity. As such a material, resin or the like is suitable. On the other hand, if the constituent members are made of resin, it is conceivable that a temperature rises due to a decrease in heat dissipation property, so that a lifetime is shortened. For this reason, it is conceivable to suppress a rotational speed and an output torque to a low level in consideration of the temperature rise.

Further, when the speed reducer is used for a robot, there is a case where it is easy to use carrier output due to the configuration thereof. In a case where a carrier on the load side is made of resin, in order to secure the strength of a tap for mounting a driven member, it is conceivable to embed a female screw made of iron by insert molding. In this case, weight increases due to the female screw made of iron, and the number of manufacturing processes increases due to the insert molding.

From these viewpoints, the first carrier 18 in this embodiment is made of metal, and the second carrier 20 is made of resin. In this case, since the first carrier 18 to which the driven member 50 is connected is made of metal, it is possible to secure the strength of the tap for mounting. Further, since the second carrier 20 is made of resin, the weight of the second carrier 20 can be reduced.

Various resins can be used for the second carrier 20. However, in this example, the second carrier 20 is made of polyacetal (POM). POM is sometimes referred to as PO. From the viewpoint of alleviating the influence of a temperature rise, the second carrier 20 in this embodiment is not in direct contact with the input shaft bearing 34 and is provided in a non-contact manner.

The resin which is used for each constituent member of this embodiment may be resin containing reinforcing fibers such as glass fibers or carbon fibers, may be resin which does not contain reinforcing fibers, and may be a material obtained by impregnating a base material such as paper or cloth with resin and laminating it.

High-speed rotation before speed reduction is input to the input shaft 12 and the input shaft bearing 34 which is disposed between the first carrier 18 and the input shaft 12. For this reason, a temperature rise of these elements is relatively large, and if heat resistance of these elements is low, an allowable input rotational speed becomes low. For this reason, the input shaft bearing 34 and the input shaft 12 may be made of metal. In this case, it is possible to suppress a decrease in the allowable input rotational speed. Since a large torsional stress is applied to the input shaft 12, it is preferable that the input shaft 12 is made of a material having higher rigidity than the first carrier 18. Therefore, in this embodiment, the first carrier 18 is made of aluminum (including an aluminum alloy, hereinafter, the same) having high heat dissipation property, and the input shaft 12 is made of iron-based metal having higher torsional strength than aluminum.

As the iron-based metal which is used for each constituent member of this embodiment, carbon steel, bearing steel, stainless steel, or the like can be used according to desired characteristics.

Since the external gear 14 is disposed in the vicinity of the input shaft 12 with a large temperature rise, it is desirable that the heat resistance temperature of the external gear 14 is high. From this viewpoint, the external gear 14 may be made of resin having a higher heat resistance temperature than the second carrier 20. In this example, the external gear 14 is made of polyetheretherketone (PEEK).

In order to secure the connection strength between the first carrier 18 and the second carrier 20, it is desirable that the carrier pin 38 has high rigidity. From this viewpoint, the carrier pin 38 is made of metal, and the spacer 37 may be made of resin for a reduction in weight. In this example, the carrier pin 38 is made of iron-based metal and the spacer 37 is made of POM.

Since the input shaft 12 is subjected to a large torsional stress as the eccentric body shaft, it is desirable that the input shaft 12 is made of a material having higher rigidity than the first carrier 18. It is desirable that the first carrier 18 is made of a material having a smaller specific gravity than the input shaft 12 for a reduction in weight. From this viewpoint, the first carrier may be made of metal having a specific gravity of 5 or less, and the input shaft 12 may be made of iron-based metal. The first carrier 18 may be made of light metal (metal having a specific gravity of 4 to 5 or less) such as aluminum, magnesium, beryllium, or titanium, or a composite material thereof. In this example, the first carrier 18 is made of aluminum.

From the viewpoint of a reduction in weight, the casing 22, the first cover 21, and the second cover 23 may be made of resin. These may be made of the same resin or may be made of different resins. In this example, the casing 22 is made of PEEK, and the first cover 21 and the second cover 23 are made of POM.

As described above, in this embodiment, the external gear 14, the second carrier 20, the casing 22, the first cover 21, the second cover 23, and the spacer 37 are made of resin. Further, the main bearings 24 and 26, the eccentric bearing 30, the input shaft bearing 34, the carrier pin 38, the inner pin 40, the input shaft 12, and the bolt 50b are made of iron-based metal. Further, the first carrier 18 is made of light metal such as aluminum. Some or all of these constituent members of this embodiment may be made of other materials.

The operation of the eccentric oscillation type speed reducer 10 configured as described above will be described. If the rotational power is transmitted from the driving device to the input shaft 12, the eccentric portion 12a of the input shaft 12 rotates around the rotation center line passing through the input shaft 12, and the external gear 14 oscillates due to the eccentric portion 12a. At this time, the external gear 14 oscillates such that its own axis rotates around the rotation center line of the input shaft 12. If the external gear 14 oscillates, the meshing position between the external gear 14 and the internal gear 16 is sequentially shifted. As a result, each time the input shaft 12 rotates once, one of the external gear 14 and the internal gear 16 rotates by an amount corresponding to the difference in the number of teeth between the external gear 14 and the internal gear 16. In this embodiment, the external gear 14 rotates on its own axis, and a decelerated rotation is output from the first carrier 18.

Another Embodiment

Figure 3:
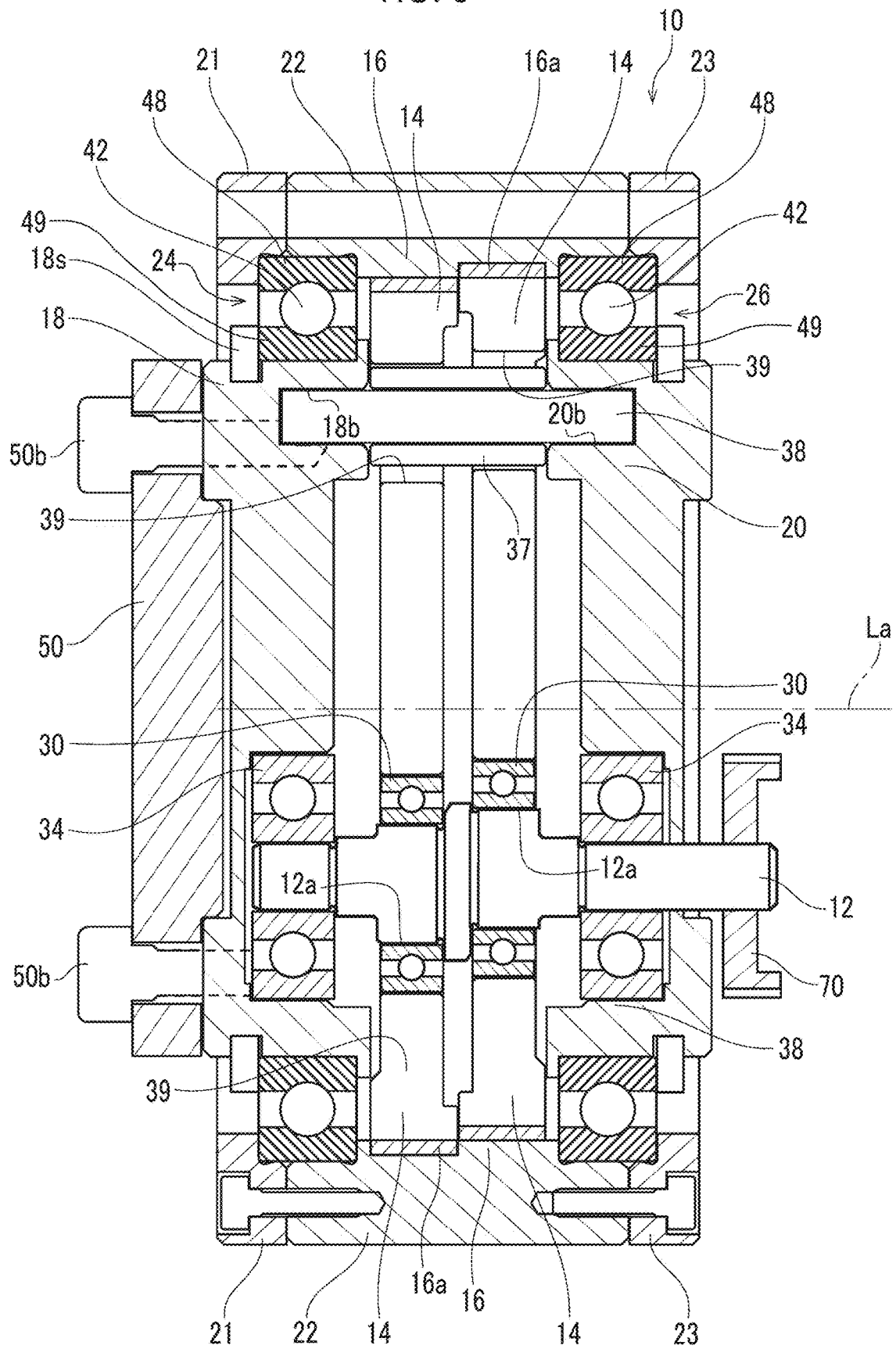
FIG. 3 is a side sectional view showing an eccentric oscillation type speed reducer according to another embodiment.

Next, the configuration of an eccentric oscillation type speed reducer 10 according to another embodiment will be described. In the drawing and description of another embodiment, constituent elements and members identical or corresponding to those in one embodiment are denoted by the same reference numerals. Description overlapping that of one embodiment will be appropriately omitted and the configurations different from those in one embodiment will be mainly described. FIG. 3 is a side sectional view showing the eccentric oscillation type speed reducer 10 of another embodiment and corresponds to FIG. 1.

In the description of one embodiment, the center crank type eccentric oscillation type gear device has been shown as an example. However the eccentric oscillation type speed reducer of this embodiment is a so-called distribution type eccentric oscillation type gear device. The eccentric oscillation type speed reducer 10 of this embodiment is mainly different from that of one embodiment in that the eccentric oscillation type speed reducer 10 of this embodiment includes a plurality of input gears 70 and the configuration of the input shaft 12 in this embodiment is different from that in one embodiment.

The plurality of input gears 70 are disposed around the central axis La of the internal gear 16. In this drawing, only one input gear 70 is shown. The input gear 70 is supported by the input shaft 12 which is inserted into a central portion of the input gear 70, and is provided so as to be rotatable integrally with the input shaft 12. The input gear 70 meshes with an external teeth portion of a rotary shaft (not shown) which is provided on the central axis La of the internal gear 16. The rotational power is transmitted from a driving device (not shown) to the rotary shaft, and the input gear 70 rotates integrally with the input shaft 12 due to the rotation of the rotary shaft.

In this embodiment, a plurality of (for example, three) input shafts 12 are disposed at intervals in the circumferential direction at positions offset from the central axis La of the internal gear 16. In this drawing, only one input shaft 12 is shown.

The operation of the eccentric oscillation type speed reducer 10 of this embodiment described above will be described. If the rotational power is transmitted from the driving device to the rotary shaft, the rotational power is distributed from the rotary shaft to the plurality of input gears 70, and the respective input gears 70 rotate in the same phase. If each input gear 70 rotates, the eccentric portion 12a of the input shaft 12 rotates around the rotation center line passing through the input shaft 12, and the external gear 14 oscillates due to the eccentric portion 12a. If the external gear 14 oscillates, similar to one embodiment, the meshing position between the external gear 14 and the internal gear 16 is sequentially shifted, and one of the external gear 14 and the internal gear 16 rotates. The rotation of the input shaft 12 is decelerated at a reduction ratio corresponding to the difference in the number of teeth between the external gear 14 and the internal gear 16 and is output from the output member to the driven device. The output member in this embodiment is also the first carrier 18.

In this embodiment, the external gear 14, the second carrier 20, the casing 22, the first cover 21, the second cover 23, and the spacer 37 are made of resin. Further, the main bearings 24 and 26, the eccentric bearing 30, the input shaft bearing 34, the carrier pin 38, the input shaft 12, and the bolt 50b are made of iron-based metal. Further, the first carrier 18 is made of light metal such as aluminum. Some or all of these constituent members of this embodiment may be made of other materials. In particular, the second carrier 20 may be made of resin having high heat resistance, such as PEEK.

The examples of embodiments of the present invention have been described in detail above. All of the embodiments described above merely show specific examples for implementing the present invention. The contents of embodiments do not limit the technical scope of the present invention, and many design changes such as changes, additions, or deletions of constituent elements can be made within a scope which does not depart from the idea of the invention defined in the claims. In the embodiment described above, the contents in which such a design change can be made are described with the notation such as "of an embodiment", or "in an embodiment". However, it does not mean that a design change is not permitted for contents without such notation. Further, the hatching applied to the cross-section of the drawing does not limit the material of the hatched object.

Hereinafter, a modification example will be described. In the drawing and description of the modification example, constituent elements and members identical or corresponding to those in the embodiments are denoted by the same reference numerals, and description overlapping those of the embodiments will be appropriately omitted, and the configurations different from those in one embodiment will be mainly described.

Modification Example

In the description of one embodiment, an example in which the internal gear 16 has the internal teeth 16a integrally formed at the inner peripheral portion of the casing 22 has been shown. However, the present invention is not limited thereto. The internal gear 16 may be provided with internally toothed pins made of the same number of metallic pin members, instead of the internal teeth 16a. In this case, the internal gear has an internal gear main body integrated with the casing, and a pin member rotatably supported on the internal gear main body. In a case where the metallic pin member is used, the casing 22 may be made of resin such as POM having lower heat resistance than PEEK.

In the description of one embodiment, an example in which two external gears 14 are provided has been shown. However, the present invention is not limited thereto. Three or more external gears 14 may be provided. For example, the input shaft may be provided with three eccentric portions 12a having phases shifted by 120°, and three external gears 14 which are oscillated by the three eccentric portions 12a may be provided. Further, the number of the external gear 14 may be one.

In the description of one embodiment, an example in which each of the second main bearing 26 and the first main bearing 24 has the inner ring has been shown. However, the present invention is not limited thereto. At least one of the second main bearing 26 and the first main bearing 24 may be a bearing having no inner ring.

In the description of one embodiment, an example in which each bearing is a ball bearing having spherical rolling elements has been shown. However, the present invention is not limited thereto. Some or all of these bearings may be roller bearings having cylindrical rolling elements.

In the description of one embodiment, an example in which the output member is the carrier 18 and the fixed member is the casing 22 has been shown. However, the present invention is not limited thereto. The fixed member may be the carrier 18 and the output member may be the casing 22.

In the description of one embodiment, an example in which the first carrier 18 and the second carrier 20 are provided has been shown. However, the present invention is not limited thereto. Only the first carrier may be provided on one side in the axial direction of the external gear.

Each of the modification examples described above exhibits the same operation and effect as those of one embodiment.

Any combination of each embodiment and the modification example described above is also useful as an embodiment of the present invention. A new embodiment resulting from the combination also has the respective effects of each embodiment and the modification example which are combined.

It should be understood that the invention is not limited to the above-described embodiment, but may be modified into various forms on the basis of the spirit of the invention. Additionally, the modifications are included in the scope of the invention.

What is claimed is:

1. An eccentric oscillation type speed reducer comprising:
   an internal gear;
   an external gear which meshes with the internal gear;
   an eccentric body shaft which oscillates the external gear; and
   a carrier disposed at a side portion of the external gear in an axial direction,
   wherein the carrier includes a first carrier which is disposed on one side in the axial direction of the external gear, and a second carrier which is disposed on the other side in the axial direction of the external gear,
   a driven member is connected to the first carrier,
   the first carrier is made of metal, and
   the second carrier is made of resin.

2. The eccentric oscillation type speed reducer according to claim 1, further comprising an input shaft bearing which is disposed between the first carrier and the eccentric body shaft,
   wherein the input shaft bearing and the eccentric body shaft are made of metal.

3. The eccentric oscillation type speed reducer according to claim 1, wherein the external gear is made of resin having a higher heat resistance temperature than the second carrier (20).

4. The eccentric oscillation type speed reducer according to claim 1, further comprising:
   a carrier pin which connects the first carrier and the second carrier; and
   a spacer which is externally fitted to the carrier pin and is disposed between the first carrier and the second carrier,
   wherein the carrier pin is made of metal, and
   the spacer is made of resin.

5. The eccentric oscillation type speed reducer according to claim 1, wherein the first carrier is made of metal having a specific gravity of 5 or less, and
   the eccentric body shaft is made of iron-based metal.

6. An eccentric oscillation type speed reducer comprising:
   an internal gear provided in a casing;
   an external gear which meshes with the internal gear;
   an eccentric body shaft which oscillates the external gear; and
   a carrier disposed at a side portion of the external gear in an axial direction,
   wherein the internal gear comprises:
      an internal gear main body integrated with the casing, and
      a pin member which is rotatably supported on the internal gear main body,
   wherein:
      the internal gear main body is made of resin,
      the casing and the external gear are made of resin,
      the carrier is made of metal, and
      the pin member is made of metal.

* * * * *